United States Patent
Yayathi et al.

(10) Patent No.: US 8,788,688 B2
(45) Date of Patent: Jul. 22, 2014

(54) METHOD AND DEVICE FOR DUPLICATING MULTICAST PACKETS

(75) Inventors: Santhanakrishnan Yayathi, Bangalore (IN); Jun Yang, Shenzhen (CN); Dong Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 130 days.

(21) Appl. No.: 12/982,055

(22) Filed: Dec. 30, 2010

(65) Prior Publication Data

US 2011/0093614 A1     Apr. 21, 2011

Related U.S. Application Data

(63) Continuation of application No. PCT/CN2010/073416, filed on Jun. 1, 2010.

(30) Foreign Application Priority Data

Jun. 1, 2009    (CN) .......................... 2009 1 0107561

(51) Int. Cl.
*H04L 12/24*    (2006.01)
*H04L 29/08*    (2006.01)
*H04L 29/06*    (2006.01)

(52) U.S. Cl.
CPC .............. *H04L 67/327* (2013.01); *H04L 67/02* (2013.01); *H04L 29/06* (2013.01)
USPC ........... 709/230; 709/246; 709/204; 709/231; 370/395.42; 370/352; 370/238; 370/239

(58) Field of Classification Search
CPC ......... H04L 67/02; H04L 29/06; H04L 41/06; H04L 45/00; H04L 29/06027; H04L 41/0213; H04L 45/56; H04L 47/10; H04L 49/252; G06F 17/30569; G06F 17/2247; G06F 17/30911
USPC .............. 370/238, 238.1, 356, 399, 432, 255, 370/340, 379, 397, 710; 709/230, 204, 203, 709/231, 247; 715/234, 242, 513, 200
See application file for complete search history.

(56) References Cited

U.S. PATENT DOCUMENTS 5,941,952 A * 8/1999 Thomas et al. ............... 709/234
(Continued)

FOREIGN PATENT DOCUMENTS

| CN | 1305163 A | 7/2001 |
|---|---|---|
| CN | 101193344 A | 6/2008 |
| CN | 101568198 A | 10/2009 |

OTHER PUBLICATIONS

International Search Report from P.R. China in International Application No. PCT/CN2010/073416 mailed Sep. 9, 2010.

(Continued)

*Primary Examiner* — Robert Wilson
*Assistant Examiner* — Sai Aung
(74) *Attorney, Agent, or Firm* — Conley Rose, P.C.; Grant Rodolph; Nicholas K. Beaulieu (57) ABSTRACT

A message sending method is provided, which includes: obtaining route feature information of a user, and sending a request of the user, where the request is data in an Efficient Extensible Markup Language (XML) Interchange (EXI) format, and the route feature information is carried in a header of the data in the EXI format. A message processing method, a client, a router, and a message processing system are further provided. Through preceding technical solutions, a user request message is routed according to route feature information in an EXI header, thereby reducing a system overhead and improving a distribution processing efficiency.

14 Claims, 5 Drawing Sheets

(56) References Cited

U.S. PATENT DOCUMENTS

| | | | |
|---|---|---|---|
| 6,601,075 B1* | 7/2003 | Huang et al. | 707/748 |
| 7,257,648 B2* | 8/2007 | McCartney et al. | 709/247 |
| 7,373,591 B2* | 5/2008 | Mory et al. | 715/205 |
| 7,571,152 B2* | 8/2009 | Thienot et al. | 1/1 |
| 7,627,566 B2* | 12/2009 | Sthanikam et al. | 1/1 |
| 7,647,552 B2* | 1/2010 | Wan | 715/234 |
| 8,010,889 B2* | 8/2011 | Gupta et al. | 715/234 |
| 8,090,731 B2* | 1/2012 | Sthanikam et al. | 707/756 |
| 2002/0085565 A1* | 7/2002 | Ku et al. | 370/395.42 |
| 2005/0014494 A1* | 1/2005 | Owen et al. | 455/419 |
| 2007/0005786 A1* | 1/2007 | Kumar et al. | 709/230 |
| 2007/0116223 A1* | 5/2007 | Burke et al. | 379/201.12 |
| 2009/0052329 A1* | 2/2009 | Mahajan et al. | 370/242 |
| 2009/0271695 A1* | 10/2009 | Ruellan et al. | 715/227 |
| 2010/0027427 A1* | 2/2010 | Kokje et al. | 370/238 |
| 2010/0083101 A1* | 4/2010 | Denoual et al. | 715/242 |
| 2011/0270895 A1* | 11/2011 | Shelby | 707/803 |

OTHER PUBLICATIONS

W3C, "Efficient XML Interchange (EXI) Format 1.0 W3C Working Draft", pp. 1-113, (Sep. 19, 2008).

W3C, "Extensible Markup Language (XML) 1.0 (Fifth Edition) W3C Recommendation", pp. 1-61, (Nov. 26, 2008).

W3C, "Efficient XML Interchange (EXI) Format 1.0, W3C Candidate Recommendation", pp. 1-127, (Dec. 8, 2009).

Foreign Communication from a counterpart application, Chinese Application No. 200910107561.0, Second Office Action dated Oct. 19, 2012, 9 pages.

Foreign Communication from a counterpart application, Chinese Application No. 200910107561.0, Partial Translation of Second Chinese Office Action dated Oct. 19, 2012, 13 pages.

First Chinese Office Action (Translation), dated (mailed) May 3, 2012; issued in related Chinese Patent Application No. 200910107561.0 (6 pgs.).

Written Opinion of the International Searching Authority related to PCT/CN2010/073416; dated (mailed) Sep. 9, 2010; filed Jun. 1, 2010; Huawei Tech Co., Ltd. (6 pgs.).

* cited by examiner

METHOD AND DEVICE FOR DUPLICATING MULTICAST PACKETS

CROSS-REFERENCE TO RELATED APPLICATIONS

This application is a continuation of International Application No. PCT/CN2010/073416, filed on Jun. 1, 2010, which claims priority to Chinese Patent Application No. 200910107561.0, filed on Jun. 1, 2009, both of which are hereby incorporated by reference in their entireties.

FIELD OF THE INVENTION

The present invention relates to the field of route transmission, and in particular, to a message sending method, a message processing method, a client, a router, and a system.

BACKGROUND OF THE INVENTION

The Extensible Markup Language (XML) is designed to store and transmit data. The XML can use the natural language and employ the American Standard Code for Information Interchange (ASCII) code for encoding. Any information can define its format and be expressed through the XML syntax. The XML is a platform-independent language. When data is transmitted between systems of different architectures, a standard mode is required. The XML achieves the object and at the same time does not rely on equipments and systems. When data is interchanged by using the XML, data is not lost due to different formats used by different systems. The advantage of the XML is that it can be used to share data and be applied to various applicable models, for example, Call Control XML (CCXML), Voice XML (VXML), and Simple Object Access Protocol (SOAP). Currently, the XML-based applications become increasingly wider. The messages requested by the users to be sent are generally expressed through the XML in the network.

According to some characteristics of web services and distributed XML applications, XML routers are complements to IP routers and become increasingly more meaningful in routing XML data. The existing XML router knows the type of the XML only by parsing the content of the message body of XML document and conveys it to a suitable node in the network.

The XML does not have a header, so that the type of the XML is known only by parsing the message body of the XML document. The distribution efficiency is very low, which brings some difficulties to the distributed application and deployment of the XML.

SUMMARY OF THE INVENTION

Embodiments of the present invention provide a message sending method, a message processing method, a client, a router, and a system, so as to reduce a system overhead and improve a distribution processing efficiency. In this way, route feature information of a user is carried in an Efficient XML Interchange (EXI) header, and a router routes a user message according to the route feature information in the EXI header, compared with the prior art in which the router parses the body of the XML message to obtain the route feature information.

An embodiment of the present invention provides a message sending method, where the method includes:
obtaining route feature information of a user; and
sending a request of the user, where the request is data in an EXI format, and the route feature information is carried in a header of the data in the EXI format.

An embodiment of the present invention provides a message processing method, where the method includes:
receiving a request from a client, where the request is data in an EXI format;
performing decoding on a header of the data in the EXI format to obtain route feature information; and
sending the request from the client according to the route feature information.

An embodiment of the present invention provides a client, where the client includes:
a route feature information module, configured to obtain route feature information of a user; and
a sending module, configured to send a request of the user, where the request is data in an EXI format, and the route feature information is carried in a header of the data in the EXI format.

An embodiment of the present invention provides a router, which provides an EXI message route, where the router includes:
a receiving module, configured to receive a request from a client, where the request is data in an EXI format;
a decoding module, configured to perform decoding on a header of the data in the EXI format to obtain route feature information; and
a routing module, configured to send the request from the client according to the route feature information.

An embodiment of the present invention provides a message processing system, where the system includes at least one client and a router communicated with at least one destination server, where:
the client is configured to obtain route feature information of a user, and send a request of the user, where the request is data in an EXI format, and the route feature information is carried in a header of the data in the EXI format;
the router is configured to receive the request from the client, where the request is the data in the EXI format, perform decoding on the header of the data in the EXI format to obtain the route feature information, and send the request from the client according to the route feature information; and
the destination server is configured to receive the request sent from the router and perform processing on the request sent from the router.

According to the preceding technical solutions, in the present invention, the route feature information of the user is carried in the EXI header, and the router routes the user request message according to the route feature information in the EXI header. Compared with the prior art in which the router parses content of the user request message to obtain the route feature information, the present invention reduces the system overhead and improves the distribution processing efficiency.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

FIG. 1 is a flowchart of a message sending method according to an embodiment of the present invention.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons skilled in the art based on the embodiments of the present invention without creative efforts shall fall within the protection scope of the present invention.

In order to make persons skilled in the art understand the technical solutions of the present invention better, the Efficient XML Interchange, EXI is briefly introduced in the following.

The EXI is defined by the W3C EXI work group, is mainly configured to encode and perform decoding on the XML content, and improves the performance of the XML processing and utilization efficiency of the memory resource. In the case that the XML content encoded with EXI is transmitted, the demand on the bandwidth is greatly decreased. The EXI can have a good compression ratio against the XML file. In the case that the compressed XML data is delivered through EXI, the demand on the bandwidth can be greatly decreased. Moreover, for the XML content of the same size, the costs consumed by the EXI storage are much less than that consumed by the original XML storage. The EXI is also helpful to resource-restricted systems being restricted on processing capacity, battery life, and memory consumption. The technical solutions of the present invention are described in detail in the following with reference to the accompanying drawings.

Figure 1:
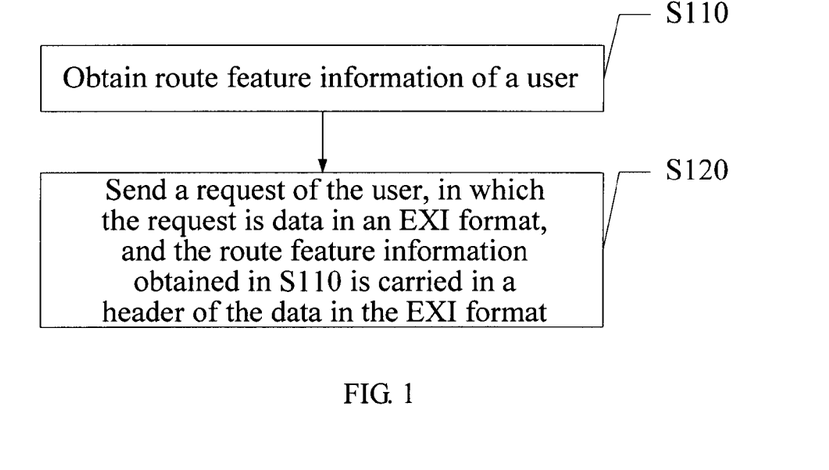

As shown in FIG. 1, the present invention provides a message sending method, which includes the following steps.

In S110, route feature information of a user is obtained.

It should be noted that, in an embodiment, content requested by the user to be sent can carry the route feature information, so that a client can obtain the route feature information of the user according to the content requested by the user. In another embodiment, the client can obtain the route feature information of the user by querying the user after presetting a query policy. In another embodiment, the client enables the user to send its own route feature information according to a sending policy after presetting the sending policy.

It should be noted that the route feature information of the user can be the type of the content to be sent in an embodiment, for example, the type of the XML document requested by the user to be sent, the type or the number of the destination server in another embodiment, and the priority or size of the content to be sent in another embodiment.

In S120, a request of the user is sent, where the request is data in an EXI format, and the route feature information obtained in S110 is carried in a header of the data in the EXI format.

A router in the network receives the data in the EXI format sent by the client and parses the EXI header to obtain the route feature information of the user, and then sends the request of the user to the destination server according to the parsed route feature information.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 2:
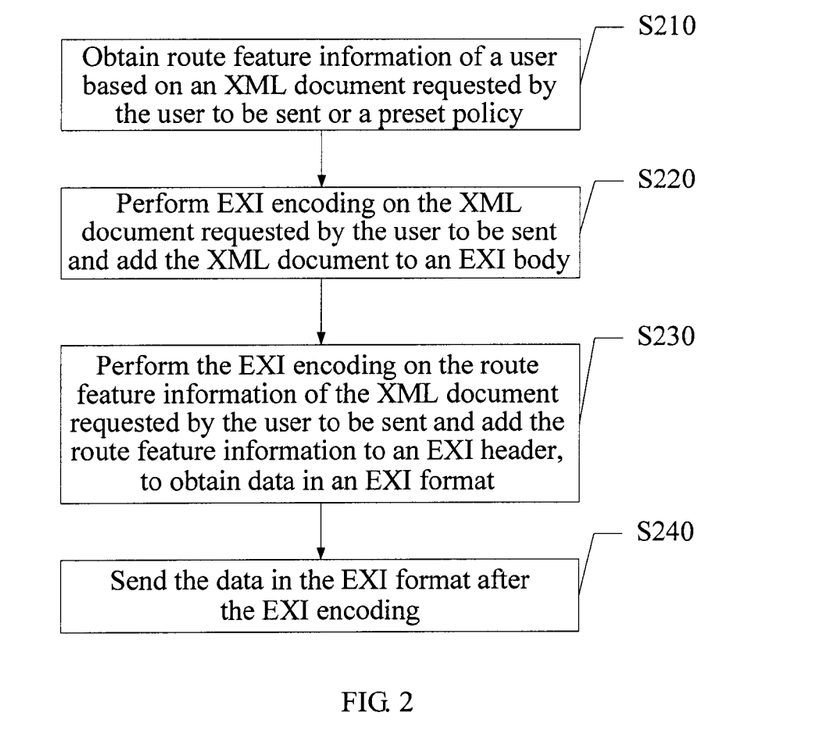
FIG. 2 is a flowchart of a message sending method according to an embodiment of the present invention.

As shown in FIG. 2, the present invention provides a message sending method, which includes the following steps.

In S210, route feature information of a user is obtained based on content requested by the user to be sent or a preset policy.

Here, in an embodiment, the content requested by the user to be sent can be an XML document. In the following, the content requested by the user to be sent is the XML document for detailed description.

It should be noted that, in an embodiment, the XML document requested by the user to be sent can carry the route feature information, so that a client can obtain the route feature information of the user according to the XML document requested by the user to be sent. In another embodiment, the client can obtain the route feature information of the user by querying the user after presetting a query policy. In another embodiment, the client enables the user to send its own route feature information to the client according to a sending policy after setting the sending policy.

It should be noted that the route feature information of the user can be the type of the XML document to be sent in an embodiment, the type or the number of the destination server in another embodiment, and the priority or size of the XML document to be sent in another embodiment.

In S220, EXI encoding is performed on the XML document requested by the user to be sent, and the XML document requested by the user to be sent is added to an EXI body.

Here, when the EXI encoding is performed on the XML document requested by the user to be sent, mainly the XML document requested by the user to be sent is added to the EXI body through the EXI encoding. After the XML document requested by the user to be sent is encoded, the data in the EXI format can be obtained.

In S230, the EXI encoding is performed on the route feature information of the XML document requested by the user to be sent, and the route feature information is added to the header of the data in the EXI format obtained in S220.

Here, the route feature information of the XML document requested by the user to be sent may also be called the route feature information of the user.

In this embodiment, the EXI encoding is performed on the route feature information of the user. In this case, the route feature information of the user may be transformed into data of the format that complies with the EXI standard and added to the EXI header.

The EXI standard specifies that the EXI header can carry EXI options, mainly used for describing the encoding policy used by the EXI body.

The EXI header can carry the EXI options. If the EXI header carries the EXI options, the value of the presence bit for EXI options in the EXI header is 1. If the EXI header does not carry the EXI options, the value of the presence bit for EXI options is 0. Therefore, the value of the presence bit for EXI options in the EXI header can be checked to determine whether the EXI header carries the EXI options.

Table 1 describes the EXI options. The values of the EXI options can be extended, for example, the user defined parts described in Table 1.

In an embodiment, if the EXI encoding is performed on the route feature information of the user, Route Info (the route feature information) and its value (capable of being further flexibly determined according to the actual situation) can be directly added to the user defined parts.

The route feature information may be added to the EXI options, for example, the type of the XML and the priority of the message. In an embodiment, the route feature information is the type of the XML being CCXML. Therefore, CCXML is added to the EXI options, the description is type of the XML (which indicates that the CCXML is a type of the XML), and the Default Value can be set to 1. Definitely, the default value may also be set to be other values.

Definitely, it should be understood that, in another embodiment, the priority information of the XML message may also be added to the user defined parts, and in another embodiment, one or more of the following information: the priority information of the XML message, the type of the XML, or the type of the destination server may also be added to the user defined parts.

In another embodiment, the route feature information of the user may also be of the XML document form. In this case, the EXI encoding is performed on the route feature information of the XML document form, and then the route feature information is added to the user defined parts of the EXI options. Definitely, in another embodiment, the route feature information of the XML document form may also be added to the user defined parts of the EXI options first, then the EXI encoding is performed on the route feature information, and the present invention is not limited.

It should be noted that in another embodiment, the EXI encoding is performed on the route feature information of the user, so that the route feature information of the XML document form requested by the user to be sent is added to fixed parts of the EXI header. For example, the route feature information can be added to the EXI Cookie part of the EXI header.

In another embodiment, the structure of the EXI header can be extended to add new options. The EXI encoding is performed on the route feature information of the user, so that the route feature information of the XML document form requested by the user to be sent is added to the new option parts. For example, a new part carrying the route information can be added to the structure of the EXI header. Then the EXI encoding is performed on the route feature information of the user, so that the route feature information of the XML document form requested by the user to be sent is added to the part carrying the route information.

TABLE 1

| EXI Option | Description | Default Value |
| --- | --- | --- |
| alignment | Alignment of event codes and content items | bit-packed |
| compression | EXI compression is used to achieve better compactness | false |
| strict | Strict interpretation of schemas is used to achieve better compactness | false |
| fragment | Body is encoded as an EXI fragment instead of an EXI document | false |
| preserve | Specifies whether comments, pis, etc. are preserved | all false |
| selfContained | Enables self-contained elements | false |
| schemaID | Identify the schema information, if any, used to encode the body | none |
| datatypeRepresentationMap | Identify datatype representations used to encode values in EXI body | none |
| blockSize | Specifies the block size used for EXI compression | 1,000,000 |
| valueMaxLength | Specifies the maximum string length of value content items to be considered for addition to the string table. | unbounded |
| valuePartitionCapacity | Specifies the total capacity of value partitions in a string table | unbounded |
| [user defined] | User defined options may be added | none |

In an embodiment, if the type of the XML document to be sent is CCXML and the priority is 0 (0 indicates the priority level, in this embodiment, 0 can be set to represent the highest priority, and definitely, in another embodiment, 0 may also be set to represent other priority levels, for example, the second highest priority). The route feature information may be added to the EXI options according to the following syntax, as described in table 2.

TABLE 2

```
<?xml version="1.0"?>
<header>
    <common>
        <compression/>
    </common>
    <!--User defined options start here--/>
    <Route-Info
        <XML-Type>CCXML</XML-Type>
        <Priority>0</Priority>
```

TABLE 2-continued

```
        </Route-Info>
    </header>
```

Here, the XML encoding is performed on the EXI header and the XML document requested by the user to be sent, so that the XML document requested by the user to be sent is added to the EXI body, and the route feature information of the user is added to the EXI header. After the EXI encoding, the EXI header and EXI Body are encoded as binary data to obtain the data in the EXI format, as described in table 3.

TABLE 3

| EXI Header | EXI Body |
|---|---|
| 101000000100100100100 | 10001000010100010001000011100100000 |

Here, after the EXI encoding, the EXI options of the EXI header carry the route feature information option of the user, and the EXI body carries the request information of the user (the XML document).

Figure 3:
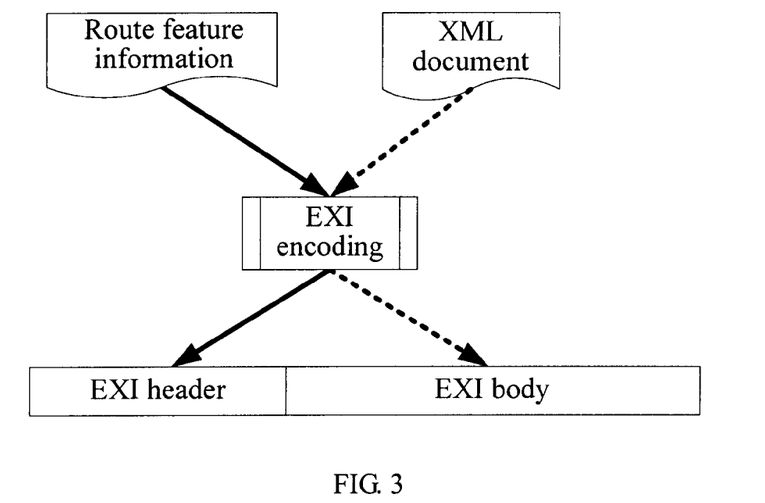
FIG. 3 is a schematic view of EXI encoding according to an embodiment of the present invention.

As shown in FIG. 3, after the EXI encoding is performed on the route feature information of the user and the XML document requested by the user to be sent, the EXI options carry the route feature information of the user, and the EXI body carries the request information of the user (the XML document).

In S240, the data in the EXI format is sent after the EXI encoding in S230.

After Step S230 is completed, the client sends the request of the user after the EXI encoding, that is, the data in the EXI format. A router in the network receives the data in the EXI format sent by the client and parses the EXI header to obtain the route feature information of the user, and then sends the request of the user to the destination server according to the parsed route feature information.

It should be noted that in another embodiment, Step S230 may also be performed before Step S220, and in another embodiment, Steps S220 and S230 may also be performed at the same time. No matter Step S230 is performed first or the two steps are performed at the same time, the data in the EXI format can be obtained after the EXI encoding is performed, and the present invention is not specifically limited.

For example, in another embodiment, step S220 is performed first, that is, the EXI encoding is performed on the route feature information of the user first to obtain the data in the EXI format, and then the EXI encoding is performed on the XML document requested by the user to be sent to add the XML document to the message body of the data in the EXI format obtained in step S220.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 4:
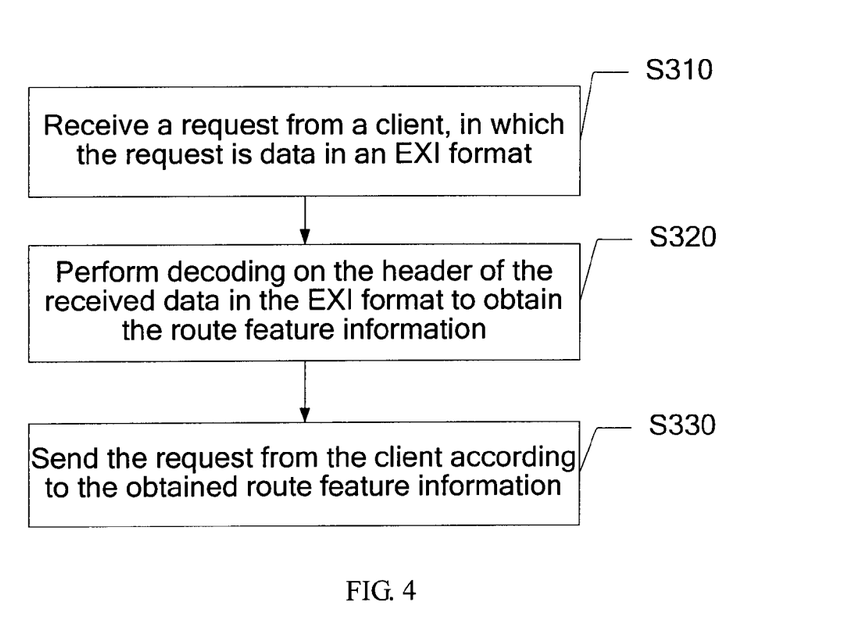
FIG. 4 is a flowchart of a message processing method according to an embodiment of the present invention.

As shown in FIG. 4, the present invention provides a message processing method, which includes the following steps.

In S310, a request from a client is received, where the request is data in the EXI format.

In the following, the content requested by the user to be sent is, for example, the XML document for detailed description.

The client performs the EXI encoding on the XML document requested by the user to be sent to obtain the data in the EXI format, and then sends out the data in the EXI format. The options of a header of the data in the EXI format carry the route feature information of the user, and the message body of the data in the EXI format carries the XML document to be sent. The specific encoding process is described in the embodiment shown in FIG. 2, and is not described here.

In S320, decoding is performed on the header of the received data in the EXI format to obtain the route feature information.

After performing decoding on the header of the received data in the EXI format, the route feature information carried in the EXI options can be obtained. The route feature information of the user can be the type of the XML document to be sent in an embodiment, the type or the number of the destination server in another embodiment, and the priority or size of the XML document to be sent in another embodiment.

In S330, the request from the client is sent according to the obtained route feature information.

After the route feature information is parsed in step S320, a preset route table may be looked up according to the route feature information to find a destination address requested by the client, and then the request from the client is sent according to the address.

In an embodiment, the destination address may be the address of the destination server requested by the client. After the address of the destination server requested by the client is obtained, the request from the client can be sent to the destination server according to the address.

It should be noted that in an embodiment, a router may directly send the request from the client to the destination server according to the address of the destination server; in another embodiment, the router may also send the request from the client to a forwarding device according to the address of the destination server first, and then the forwarding device sends the request from the client to the destination server.

Here, it should be noted that in an embodiment, if the destination server supports the EXI format, the request from the client, that is, the data in the EXI format, as the data in the EXI format shown in Table 3, is sent out directly.

In another embodiment, if the destination server does not support the EXI format, content of the EXI body in the request from the client is transformed into the XML document, and then the request from the client is sent.

For example, if it is known from the parsed route feature information that the type of the request from the client is CCXML, the request from the client is sent to the CCXML server.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header.

Compared with the prior art in which the router parses the body of the XML message to obtain the route feature information, the present invention reduces the system overhead and improves the distribution processing efficiency.

Figure 5:
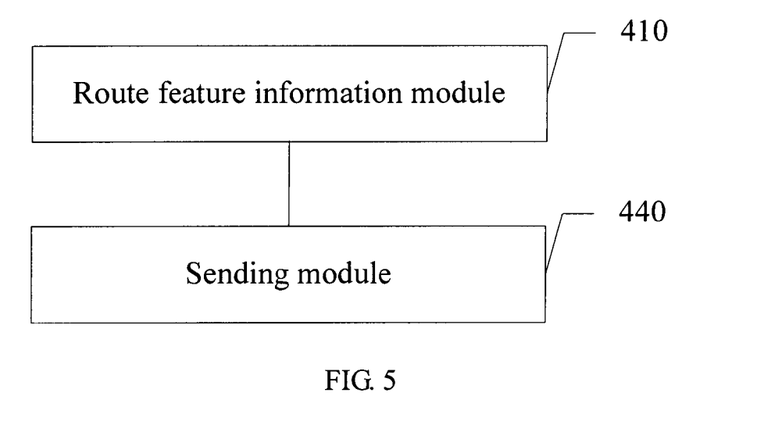
FIG. 5 is a structural schematic view of a client according to an embodiment of the present invention.

As shown in FIG. 5, the present invention provides a client, which includes a route feature information module 410 and a sending module 440.

The route feature information module 410 is configured to obtain route feature information of a user.

The content requested by the user to be sent is, for example, the XML document for detailed description.

The route feature information module 410 is specifically configured to obtain the route feature information of the XML document requested by the user to be sent according to the XML document requested by the user to be sent or a preset policy.

Here, the route feature information of the XML document requested by the user to be sent can also be called the route feature information of the user.

In an embodiment, the XML document requested by the user to be sent can carry the route feature information. Therefore, the route feature information module 410 can obtain the route feature information of the user according to the XML document requested by the user to be sent. In another embodiment, the route feature information module 410 can obtain the route feature information of the user by querying the user after presetting a query policy. In another embodiment, the route feature information module 410 can enable the user to send its own route feature information according to a sending policy after presetting the sending policy.

The sending module 440 is configured to send the request of the user, where the request is the data in the EXI format, and the route feature information is carried in the header of the data in the EXI format A router in the network receives the data in the EXI format sent by the client and parses the EXI header to obtain the route feature information of the user, and then sends the request of the user to the destination server according to the parsed route feature information.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 6:
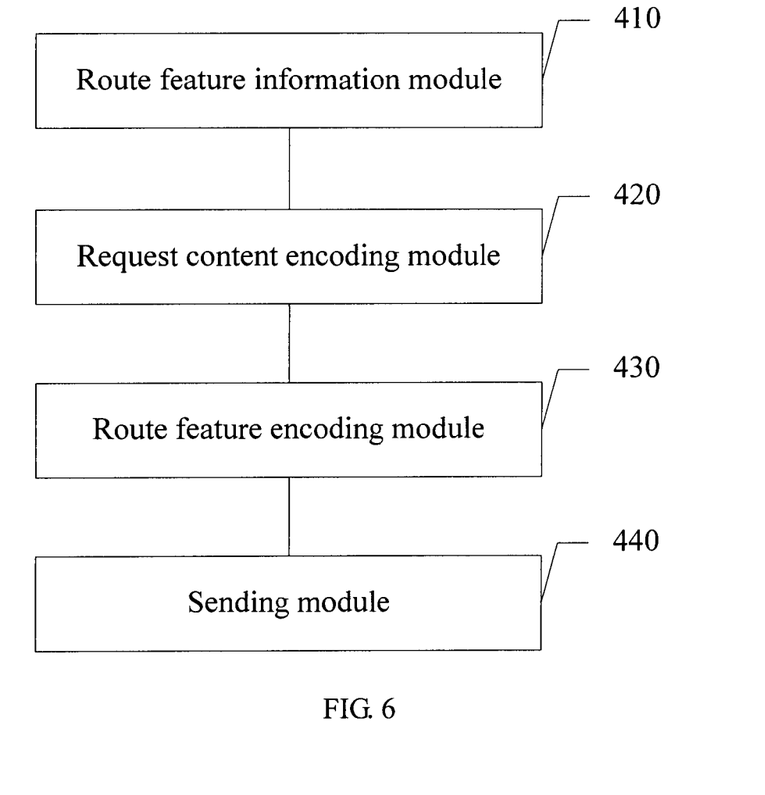
FIG. 6 is a structural schematic view of a client according to an embodiment of the present invention.

As shown in FIG. 6, in another embodiment, the client may further include a request content encoding module 420 and a route feature encoding module 430.

The request content encoding module 420 is configured to perform EXI encoding on content requested by the user to be sent, and add the content to an EXI body.

The route feature encoding module 430 is configured to perform the EXI encoding on the route feature information to add the route feature information to an EXI header, thus obtaining the data in the EXI format.

The specific encoding process is described in detail in preceding embodiments, and is not described here.

The data processed by the request content encoding module 420 and route feature encoding module 430 is the data in the EXI format, where the header of the data in the EXI format carries the route feature information of the user, and the message body carries the content requested by the user to be sent.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 7:
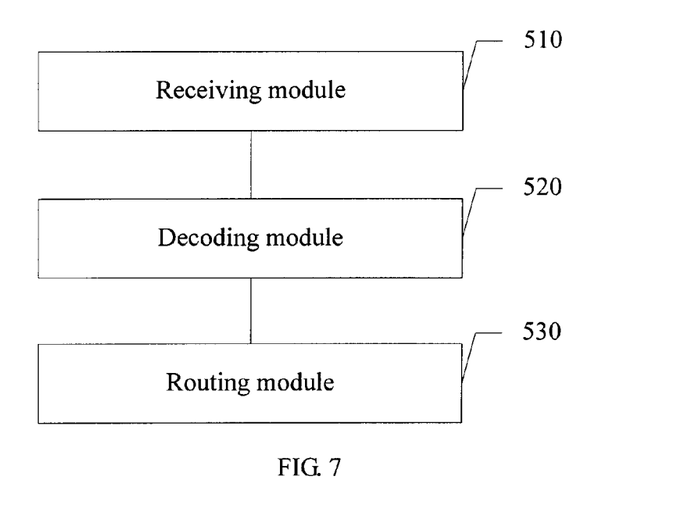
FIG. 7 is a structural schematic view of a router according to an embodiment of the present invention.

As shown in FIG. 7, the present invention provides a router, which includes a receiving module 510, a decoding module 520, and a routing module 530.

The receiving module 510 is configured to receive a request from a client, where the request is data in an EXI format.

The decoding module 520 is configured to perform decoding on a header of the received data in the EXI format to obtain route feature information of a user.

After performing decoding on the header of the received data in the EXI format, the decoding module 520 can obtain the route feature information carried in EXI options. The route feature information of the user can be the type of the XML document to be sent in an embodiment, the type or the number of the destination server in another embodiment, and the priority or size of the XML document to be sent in another embodiment.

The routing module 530 is configured to send the request from the client according to the parsed route feature information.

Figure 8:
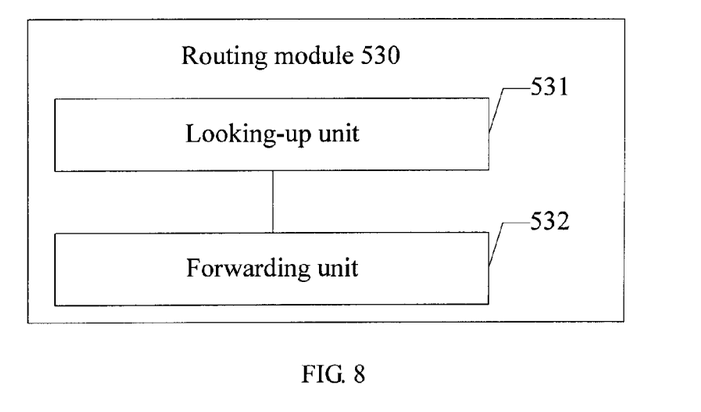
FIG. 8 is a structural schematic view of a routing module in a router according to an embodiment of the present invention.

Further, in another embodiment, as shown in FIG. 8, the routing module 530 may include a looking-up unit 531 and a forwarding unit 532.

The looking-up unit 531 is configured to look up a preset route table according to the parsed route feature information to find a destination address requested by the client.

The forwarding unit 532 is configured to send the request from the client according to the address found by the looking-up unit 531.

In an embodiment, the destination address may be the address of the destination server requested by the client. After the looking-up unit 531 obtains the address of the destination server requested by the client, the forwarding unit 532 may send the request from the client to the destination server according to the address.

It should be noted that in an embodiment, the routing module 530 may directly send the request from the client to the destination server according to the address of the destination server; in another embodiment, the routing module 530 may also send the request from the client to a forwarding device according to the address of the destination server first, and then the forwarding device sends the request from the client to the destination server.

Here, it should be noted that in an embodiment, if the destination server supports the EXI format, the routing module 530 directly sends out the request from the client, that is, the data in the EXI format, as the data in the EXI format shown in Table 3.

In another embodiment, if the destination server does not support the EXI format, the routing module 530 transforms content of the EXI body in the request from the client into the XML document, and then sends the request from the client.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 9:
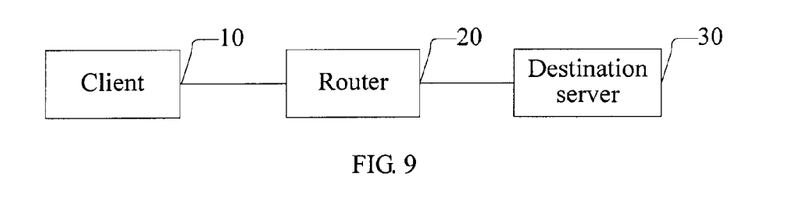
FIG. 9 is a structural schematic view of a message processing system according to an embodiment of the present invention.

As shown in FIG. 9, the present invention provides a message processing system, which includes at least one client 10 and a router 20 communicated with at least one destination server 30.

The client 10 is configured to obtain route feature information of a user and send a request of the user, where the request is data in the EXI format, and the route feature information is carried in a header of the data in the EXI format.

Specifically, the XML is set as an example for description.

The EXI encoding is performed on an XML document requested by the user to be sent to add the XML document to the EXI body, and the EXI encoding is performed on the route feature information of the XML document requested by the user to be sent to add the route feature information to the EXI header, so that the data in the EXI format is obtained. Then, the data in the EXI format after the EXI encoding is sent.

The router 20 is configured to receive the request from the client, where the request is the data in the EXI format sent by the client 10. Decoding is performed on the header of the received data in the EXI format to obtain the route feature information of the user. Then the request from the client is sent according to the parsed route feature information.

The destination server 30 is configured to receive the request sent from the router 20 and perform processing on the request sent from the router 20.

The structure of the client 10 may be shown as the structure in FIG. 5 in an embodiment and may also be shown as the structure in FIG. 6 in another embodiment. The structure of the router 20 may be the structure as shown in FIG. 7 in an embodiment and may also be shown as structures in FIGS. 7 and 8 in another embodiment.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Figure 10:
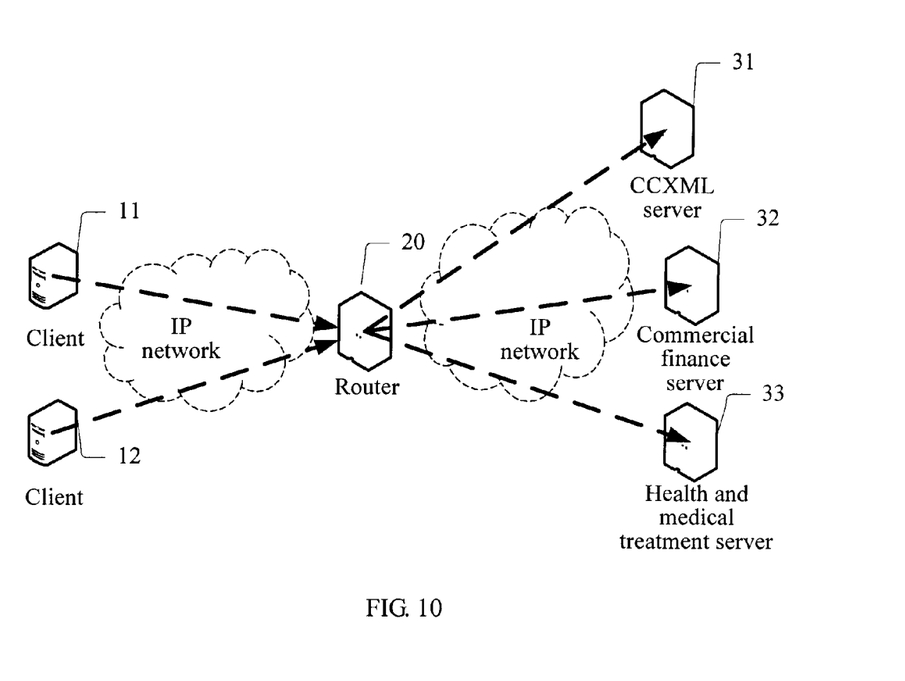
FIG. 10 is a structural schematic view of distributed application of a message processing system according to an embodiment of the present invention.

As shown in FIG. 10, a schematic view of a specific application environment of the message processing system shown in FIG. 7 is shown, which includes two clients i.e. a client 11 and a client 12, a router 30, and three destination servers respectively being a position server 31, a commercial finance server 32, and a health and medical treatment server 33.

In an embodiment, the client 11 performs the EXI encoding on the XML document requested by a user to send and sends the encoded XML document. It is assumed that the type of the XML document requested by the user to be sent is CCXML. The client 11 performs the EXI encoding on the XML document requested by the user to be sent, and adds the route feature information (i.e. the type of the XML document requested by the user to be sent is CCXML) to EXI options of the EXI header through the EXI encoding, thereby obtaining the data in the EXI format and sending the data in the EXI format to the router 20 in the network. The specific operation steps are described in preceding embodiments, and are described here.

After receiving the data in the EXI format sent from the client 11, the router 20 perform decoding on the header of the data in the EXI format, and determines that the XML document requested by the user to be sent is CCXML. Then, the router 20 looks up a preset route table to find the position of the CCXML server 31 in the network and sends the data in the EXI format to the CCXML server 31. After receiving the data in the EXI format sent by the router 20, the CCXML server 31 performs corresponding processing.

Definitely, in another embodiment, the route feature information of the user may also be the type of the destination server, for example, the health and medical treatment server 33. After receiving the request in EXI format sent by the client 12, the router 20 parses the header of the request to obtain that the destination server that the request from the client is sent to is the health and medical treatment server. The router looks up the preset route table to obtain the address of the health and medical treatment server 33, and sends the request from the client to the health and medical treatment server 33.

According to the preceding technical solution, in the present invention, the route feature information of the user is carried in the EXI header, and then the EXI encoding is performed on the EXI header and the XML document. In the case that the compressed XML data is delivered through the EXI, the demand on the bandwidth and system can be decreased, the utilization ratio of the network bandwidth can be increased, and the storage efficiency of the XML can be improved. Moreover, the router can route the XML message according to the route feature information in EXI header. Compared with the prior art in which the router parses the body of the XML message to obtain the route feature information, the present invention reduces the system overhead and improves the distribution processing efficiency.

Persons skilled in the art should understand that all or a part of the steps of the method according to the embodiments of the present invention may be implemented by a program instruction relevant hardware. The program may be stored in a computer readable storage medium. When the program is run, the steps of the method according to the embodiments of the present invention are performed. The storage medium may be the following medium, such as a magnetic disk, an optical disk, a read-only memory (ROM), and a random access memory (RAM).

The above descriptions are merely a few embodiments of the present invention. Various modifications can be made to the present invention by persons skilled in the art without departing from the spirit and principle of the present invention.

What is claimed is:

1. A method for sending an Extensible Markup Language (XML) document by a client device that is an end-station device configured to connect to a router, the method comprising:

obtaining route feature information that includes a type of the XML document, a priority of the XML document, or both, wherein the type of the XML document includes Call Control XML (CCXML), and wherein the route feature information is not a destination address;

performing Efficient XML Interchange (EXI) encoding on the XML document to obtain an EXI encoded XML document;

adding the EXI encoded XML document to an EXI body of an EXI format data packet;

performing EXI encoding on the route feature information to obtain EXI encoded route feature information;

adding the EXI encoded route feature information to an EXI header of the EXI format data packet, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format; and sending the EXI format data packet to the router, wherein the EXI encoded route feature information included in the EXI header of the EXI format data packet is used for searching a corresponding destination address of a destination server for sending the XML document on the router to the destination server.

2. The method according to claim 1, wherein obtaining the route feature information comprises:

obtaining the route feature information according to a type of the XML document requested by the user to be sent; or obtaining the route feature information according to a preset policy.

3. The method according to claim 1, wherein the route feature information is carried in user defined parts of options of the EXI header of the EXI format data packet.

4. The method according to claim 1, wherein the route feature information is carried in fixed parts of the EXI header of the EXI format data packet.

5. The method according to claim 1, wherein the route feature information is carried in new option parts extended to the EXI header of the EXI format data packet.

6. A method for routing an Extensible Markup Language (XML) document by a router, the method comprising:

receiving an Efficient XML Interchange (EXI) format data packet from a client device, wherein an EXI header of the EXI format data packet includes EXI encoded route feature information, and wherein an EXI body of the EXI format data packet includes an EXI encoded XML document, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format;

obtaining the XML document by performing EXI decoding on the EXI body of the EXI format data packet;

obtaining route feature information by performing EXI decoding on the EXI header of the EXI format data packet, wherein the route feature information includes a type of the XML document, a priority of the XML document, or both, wherein the type of the XML document includes Call Control XML (CCXML), and the route feature information is not a destination address;

finding a destination address by looking up a preset route table according to the route feature information; and sending the XML document to a destination server according to the destination address.

7. A client device that is an end-station device configured to connect to a router, the client device comprising:

a memory that stores instructions; and a processor executing said instructions configured to:

obtain route feature information including a type of an Extensible Markup Language (XML) document, a priority of the XML document, or both, wherein the type of the XML document includes Call Control XML (CCXML), wherein the route feature information is not a destination address;

perform Efficient XML Interchange (EXI) encoding on the XML document to obtain an EXI encoded XML document;

add the EXI encoded XML document to an EXI body of an EXI format data packet;

perform EXI encoding on the route feature information to obtain EXI encoded route feature information;

add the EXI encoded route feature information to an EXI header of the EXI format data packet, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format; and send the EXI format data packet to the router, wherein the EXI encoded route feature information included in the EXI header of the EXI format data packet is used for searching a corresponding destination address of a destination server for sending the XML document on the router to the destination server.

8. A router, which is a network element configured to connect to a client device that is an end-station device, comprising:

a memory that stores instructions; and a processor executing said instructions configured to:

receive an Efficient Extensible Markup Language Interchange (EXI) format data packet from a client device, wherein an EXI header of the EXI format data packet includes EXI encoded route feature information, and wherein an EXI body of the EXI format data packet includes an EXI encoded XML document, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format;

obtain an Extensible Markup Language (XML) document by performing EXI decoding on the EXI body of the EXI format data packet;

obtain route feature information by performing EXI decoding on the EXI header of the EXI format data packet, wherein the route feature information includes a type of an XML document, a priority of the XML document, or both, wherein the type of the XML document includes Call Control XML (CCXML), and wherein the route feature information is not a destination address;

find a destination address by looking up a preset route table according to the route feature information; and send the XML document to a destination server according to the destination address.

9. A non-transitory computer-readable medium having computer executable instructions, configured to:

cause a client device that is an end-station device configured to connect to a router having a processor to execute the instructions to perform steps comprising:

obtaining route feature information including a type of an Extensible Markup Language (XML) document, a priority of the XML document, or both, wherein the type of the XML document includes Call Control XML (CCXML), and wherein the route feature information is not a destination address;

performing Efficient XML Interchange (EXI) encoding on the XML document to obtain an EXI encoded XML document;

adding the EXI encoded XML document to an EXI body of an EXI format data packet;

performing EXI encoding on the route feature information to obtain EXI encoded route feature information;

adding the EXI encoded route feature information to an EXI header of the EXI format data packet, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format; and sending the EXI format data packet to a router, wherein the EXI encoded route feature information included in the EXI header of the EXI format data packet is used for searching a corresponding destination address of a destination server for sending the XML document on the router to the destination server.

10. A non-transitory computer-readable medium having computer executable instructions, configured to:

cause a router, which is a network element configured to connect to a client device that is an end-station device, having a processor to to execute the instructions to perform steps comprising:

receiving an Efficient Extensible Markup Language Interchange (EXI) format data packet from a client device, wherein an EXI header of the EXI format data packet includes EXI encoded route feature information, and wherein an EXI body of the EXI format data packet includes an EXI encoded Extensible Markup Language (XML) document, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format;

obtaining an XML document by performing EXI decoding on the EXI body of the EXI format data packet;

obtaining route feature information by performing EXI decoding on the EXI header of the EXI format data packet, wherein the route feature information includes a type of an Extensible Markup Language (XML) document, a priority of the XML document, or both, wherein the type of the XML document includes Call Control XML (CCXML), and wherein the route feature information is not a destination address;

finding a destination address by looking up a preset route table according to the route feature information; and sending the XML document to a destination server according to the destination address.

11. The method according to claim 6, wherein obtaining the route feature information by performing EXI decoding on the EXI header of the EXI format data packet comprises obtaining the route feature information by decoding binary data in the EXI header of the EXI format data packet.

12. The router according to claim 8, wherein in obtaining the XML document by performing EXI decoding on the EXI body of the EXI format data packet, the processor is configured to obtain the XML document by decoding binary data in the EXI body of the EXI format data packet.

13. The router according to claim 8, wherein in obtaining the route feature information by performing EXI decoding on the EXI header of the EXI format data packet, the processor is configured to obtain the route feature information by decoding binary data in the EXI header of the EXI format data packet.

14. The method according to claim 6, wherein obtaining the XML document by performing EXI decoding on the EXI body of the EXI format data packet comprises obtaining the XML document by decoding binary data in the EXI body of the EXI format data packet.

* * * * *

UNITED STATES PATENT AND TRADEMARK OFFICE
CERTIFICATE OF CORRECTION

PATENT NO. : 8,788,688 B2
APPLICATION NO. : 12/982055
DATED : July 22, 2014
INVENTOR(S) : Santhanakrishnan Yayathi et al.

It is certified that error appears in the above-identified patent and that said Letters Patent is hereby corrected as shown below:

In the Claims

Column 14, lines 3-33, Claim 7 should read:

A client device that is an end-station device configured to connect to a router, the client device comprising:
a memory that stores instructions; and
a processor coupled to the memory and configured to execute the instructions to:
obtain route feature information including a type of an Extensible Markup Language (XML) document, a priority of the XML document, or both, wherein the type of the XML document includes Call Control XML (CCXML), wherein the route feature information is not a destination address;
perform Efficient XML Interchange (EXI) encoding on the XML document to obtain an EXI encoded XML document;
add the EXI encoded XML document to an EXI body of an EXI format data packet;
perform EXI encoding on the route feature information to obtain EXI encoded route feature information;
add the EXI encoded route feature information to an EXI header of the EXI format data packet, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format; and
send the EXI format data packet to the router, wherein the EXI encoded route feature information included in the EXI header of the EXI format data packet is used for searching a corresponding destination address of a destination server for sending the XML document on the router to the destination server.

Column 14, lines 34-65, Claim 8 should read:

A router, which is a network element configured to connect to a client device that is an end-station Signed and Sealed this
Twenty-third Day of September, 2014

Michelle K. Lee
*Deputy Director of the United States Patent and Trademark Office*

CERTIFICATE OF CORRECTION (continued)
U.S. Pat. No. 8,788,688 B2 device, comprising:
a memory that stores instructions; and
a processor coupled to the memory and configured to execute the instructions to:
receive an Efficient Extensible Markup Language Interchange (EXI) format data packet from a client device, wherein an EXI header of the EXI format data packet includes EXI encoded route feature information, and wherein an EXI body of the EXI format data packet includes an EXI encoded XML document, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format;
obtain an Extensible Markup Language (XML) document by performing EXI decoding on the EXI body of the EXI format data packet;
obtain route feature information by performing EXI decoding on the EXI header of the EXI format data packet, wherein the route feature information includes a type of an XML document, a priority of the XML document, or both, wherein the type of the XML document includes Call Control XML (CCXML), and wherein the route feature information is not a destination address;
find a destination address by looking up a preset route table according to the route feature information; and send the XML document to a destination server according to the destination address.

Column 14, line 66 - Column 15, line 30, Claim 9 should read:

A non-transitory computer-readable medium having computer executable instructions, configured to: cause a client device that is an end-station device configured to connect to a router to execute the instructions to perform steps comprising:
obtaining route feature information including a type of an Extensible Markup Language (XML) document, a priority of the XML document, or both, wherein the type of the XML document includes Call Control XML (CCXML), and wherein the route feature information is not a destination address;
performing Efficient XML Interchange (EXI) encoding on the XML document to obtain an EXI encoded XML document;
adding the EXI encoded XML document to an EXI body of an EXI format data packet;
performing EXI encoding on the route feature information to obtain EXI encoded route feature information;
adding the EXI encoded route feature information to an EXI header of the EXI format data packet, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format; and
sending the EXI format data packet to a router, wherein the EXI encoded route feature information included in the EXI header of the EXI format data packet is used for searching a corresponding destination address of a destination server for sending the XML document on the router to the destination server.

Column 15, line 31 - Column 16, line 21, Claim 10 should read:

A non-transitory computer-readable medium having computer executable instructions, configured to:

CERTIFICATE OF CORRECTION (continued)
U.S. Pat. No. 8,788,688 B2 which when executed by a router cause a [[the]] router, which is a network element configured to connect to a client device that is an end-station device, to execute the instructions to perform steps a method comprising:

receiving an Efficient Extensible Markup Language Interchange (EXI) format data packet from a client device, wherein an EXI header of the EXI format data packet includes EXI encoded route feature information, and wherein an EXI body of the EXI format data packet includes an EXI encoded Extensible Markup Language (XML) document, wherein the EXI format data packet includes the EXI header and the EXI body, wherein the EXI header and the EXI body are separate parts of the EXI format data packet, and wherein each of the EXI header and the EXI body is encoded as binary data to obtain the EXI format data packet in the EXI format;

obtaining an XML document by performing EXI decoding on the EXI body of the EXI format data packet;

obtaining route feature information by performing EXI decoding on the EXI header of the EXI format data packet, wherein the route feature information includes a type of an Extensible Markup Language (XML) document, a priority of the XML document, or both, wherein the type of the XML document includes Call Control XML (CCXML), and wherein the route feature information is not a destination address;

finding a destination address by looking up a preset route table according to the route feature information; and sending the XML document to a destination server according to the destination address.